W. Mason.
Mode of Making Wells.

No. 112,613. Patented Mar. 14, 1871.

Witnesses;
Ebenezer Richmond
Volney W. Mason

Inventor;
William Mason

United States Patent Office.

WILLIAM MASON, OF PROVIDENCE, RHODE ISLAND.

Letters Patent No. 112,613, dated March 14, 1871.

IMPROVEMENT IN THE MODES OF MAKING WELLS.

The Schedule referred to in these Letters Patent and making part of the same.

I, WILLIAM MASON, of the city and county of Providence, State of Rhode Island, have invented certain Improvements in Wells, of which the following is a specification.

My invention pertains to an improved mode of constructing dug wells, and aims at lessening the time, labor, and expense hitherto attending the operation, and providing ready and convenient means of deepening the same when necessary.

In carrying out my plan, I commence by excavating a shallow cavity in the earth in the usual way, then apply cement to the earth wall, and thus proceed, alternately excavating and applying cement, until water is reached, when I employ a cement cylinder to enable me to deepen the well yet further, or to keep back the sand and water which accumulate more or less rapidly.

In the accompanying drawing—

$c$ represents the capstone.

$b$, the brick-work.

$a\ a\ a\ a$, the vertical cement walls of the well, closely and intimately joined or united by the plastic and adhesive quality of the cement to the composition of the various stratums by which it passes, thereby forming an impervious coating over the stratums at the same time the cement forms a portion of the stratums, as it were, by its intimate connection.

Figure 1:
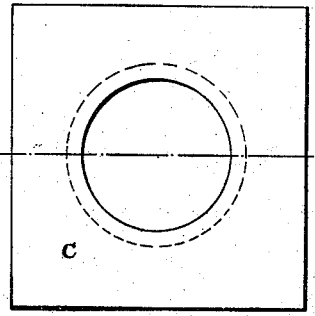
Figure 1 represents the top or capstone of the well.
Figure 2:
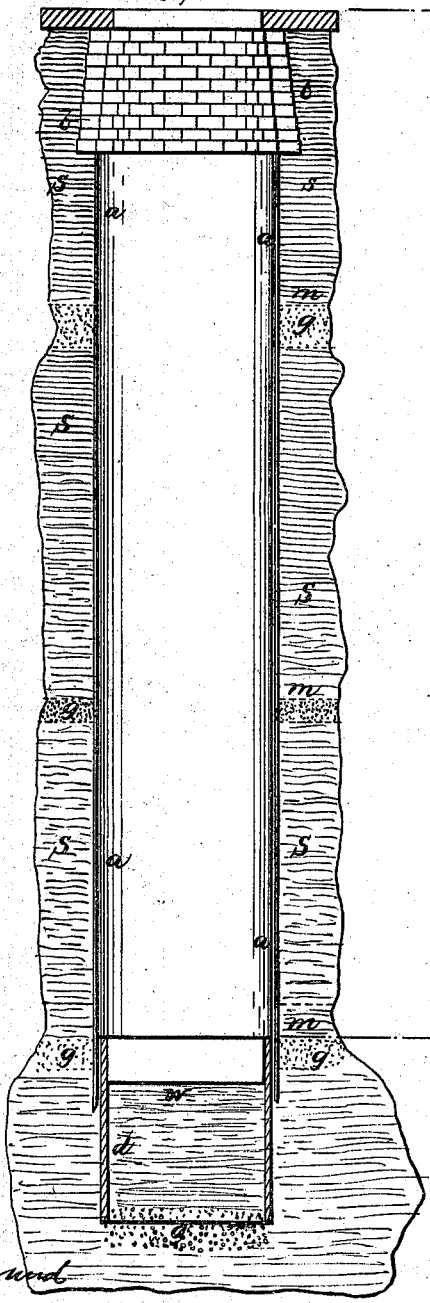
Figure 2 is a vertical transverse section of a well from top to bottom, the different parts being indicated by the following letters.
Figure 3:
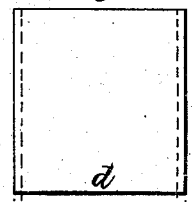
Figure 4:
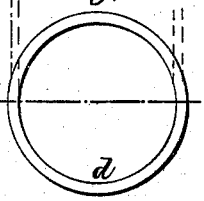

Figures 3 and 4 are plan and elevation of a cement cylinder, also shown by the letters $d\ d$, which is settled into the water after the cementing of the well is completed.

The letter $g$ at the bottom of the well shows gravel, which I usually place there after settling the cement cylinder.

The other letters $g\ g$ indicate gravel stratums, usually passed through in digging down.

Stratums of marl or clay are shown by letters $m\ m$. These stratums are very fine in their composition, also very dense or compact, through which water passes very slowly, very much like perspiration passing off through the pores of the skin, thereby very thoroughly purifying the water.

Method of Construction.

I commence by digging down about two feet, then lay two or three courses of brick around firmly in cement, their inner diameter being of the diameter I propose to make the well.

I then dig down about three or four feet, and commence and cement down from the courses of brick; then alternately dig and cement until the requisite depth is reached, usually cementing a little below the water-line.

Then having previously prepared the cement cylinder $d$, I lower it to the bottom of the well, then settle it into the water the required depth by digging inside and under the cylinder. This cylinder I usually make a trifle less in diameter than the diameter of the well.

After settling the cylinder, I proceed and finish up the top, by bricking it up as high as required, and place the capstone in cement over the brick-work, when the well is completed.

Should it ever be necessary to go down lower to get water by reason of insufficient supply, the cement cylinder may be settled as before, and the sides of the well cemented lower if necessary.

It will be obvious that by my plan of constructing wells the water will be much purer than water obtained from stone wells, for the reason that by my plan all surface-water is excluded, as before described.

By my plan the cost of constructing a well is considerably lessened.

In many stone wells, especially in cities, the water which was good when the wells were first constructed, has become impure, because they become receivers of the constant drainage of the nearest privies, cesspools, &c., receiving imperfectly-filtered fluids at all points from the top to the bottom through the open stone-work.

Claim.

What I claim is—

The mode of constructing wells by means of the cement $a$ and cylinder $d$, in the manner set forth.

WILLIAM MASON.

Witnesses:
 EBENEZER RICHMOND,
 VOLNEY W. MASON.